United States Patent
Plasberg et al.

(10) Patent No.: US 8,836,861 B2
(45) Date of Patent: Sep. 16, 2014

(54) METHOD AND APPARATUS FOR PROCESSING A VIDEO SIGNAL

(75) Inventors: Jan Plasberg, Farsta (SE); Andrei Jefremov, Järfälla (SE)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/339,180

(22) Filed: Dec. 28, 2011

(65) Prior Publication Data

US 2012/0169929 A1    Jul. 5, 2012

Related U.S. Application Data

(60) Provisional application No. 61/428,000, filed on Dec. 29, 2010.

(51) Int. Cl.
*H04N 7/00* (2011.01)
*H04N 21/845* (2011.01)
*H04N 21/432* (2011.01)
*H04N 21/44* (2011.01)

(52) U.S. Cl.
CPC ..... *H04N 21/44004* (2013.01); *H04N 21/8455* (2013.01); *H04N 21/4325* (2013.01)
USPC ........................................ 348/497; 348/419.1

(58) Field of Classification Search
USPC .................... 348/497–49, 419.1, 9
See application file for complete search history.

(56) References Cited

U.S. PATENT DOCUMENTS

| | | | |
|---|---|---|---|
| 6,665,751 B1 | 12/2003 | Chen et al. | |
| 2004/0172478 A1 | 9/2004 | Jacobs et al. | |
| 2004/0218673 A1* | 11/2004 | Wang et al. | 375/240.12 |
| 2008/0181256 A1 | 7/2008 | Schwartz et al. | |
| 2011/0010625 A1* | 1/2011 | Pettersson et al. | 715/716 |

FOREIGN PATENT DOCUMENTS

EP    1437896    7/2004

OTHER PUBLICATIONS

"PCT Search Report and Written Opinion", Application No. PCT/EP2011/073969, (Mar. 12, 2012), 13 pages.

* cited by examiner

*Primary Examiner* — Michael Lee
(74) *Attorney, Agent, or Firm* — Sonia Cooper; Jim Ross; Micky Minhas

(57) ABSTRACT

Method, apparatus and computer program product for processing a video signal, the video signal comprising a plurality of frames, wherein the frames of the video signal are received at a jitter buffer, and the frames are output from the jitter buffer at a variable output rate to account for jitter in the received frames. Variations in the output rate are controlled in dependence upon the visual information content of the video signal, the visual information content of the video signal being the portion of the video signal that is to be displayed when the video signal is played out.

25 Claims, 2 Drawing Sheets

METHOD AND APPARATUS FOR PROCESSING A VIDEO SIGNAL

RELATED APPLICATION

This application claims the benefit of U.S. Provisional Application No. 61/428,000, filed on Dec. 29, 2010. The entire teachings of the above application are incorporated herein by reference.

TECHNICAL FIELD

The present invention relates to a method and apparatus for processing a video signal. In particular, the present invention relates to controlling the output rate of frames of a video signal from a jitter buffer.

BACKGROUND

Users can communicate with each other over a communications network by transmitting and receiving signals over the network. Advances in communications technology have resulted in a rapid increase in the number of users communicating over such networks and also in the volume of data being transferred between users in a communication. Networks now support the transmission of video signals between users. Video signals may comprise a sequence of frames which are displayed sequentially when the video signal is played out. As is known in the art video signals can be encoded according to a number of different protocols for transmission over a network.

When a device receives frames of a video signal over a communications network a certain amount of dejittering is needed before the frames are played out. For example, this may be due to the timing of the frames arriving at the receiving device being disrupted by problems in the network. The receiving device may store the received video frames in a jitter buffer in order to smooth out some of the jitter in the received frames. However, even when a jitter buffer is used at the receiving device jitter may occur in the video frames, for example when the jitter buffer becomes completely full or completely empty. In order to handle the remaining jitter an algorithm can be implemented at the receiving device to calculate how the output rate of the video frames from the jitter buffer should be varied to reduce the jitter of the video frames. The algorithm aims to reduce the number of times that the jitter buffer will become completely empty or completely full by varying the output rate of frames from the jitter buffer.

SUMMARY

According to a first aspect of the invention there is provided a method of processing a video signal, the video signal comprising a plurality of frames, the method comprising: receiving the frames of the video signal at a jitter buffer; outputting the frames from the jitter buffer at a variable output rate to account for jitter in the received frames, wherein variations in the output rate are controlled in dependence upon the visual information content of the video signal, the visual information content of the video signal being the portion of the video signal that is to be displayed when the video signal is played out.

According to a second aspect of the invention there is provided apparatus for processing a video signal, the video signal comprising a plurality of frames, the apparatus comprising: a jitter buffer for receiving the frames of the video signal, the apparatus being configured to output the frames from the jitter buffer at a variable output rate to account for jitter in the received frames, the apparatus further comprising a controller for controlling variations in the output rate in dependence upon the visual information content of the video signal, the visual information content of the video signal being the portion of the video signal that is to be displayed when the video signal is played out.

According to a third aspect of the invention there is provided a computer program product comprising a non-transitory computer readable medium storing thereon computer readable instructions for execution by a processor for processing a video signal, the video signal comprising a plurality of frames, the instructions comprising instructions for: receiving the frames of the video signal at a jitter buffer; outputting the frames from the jitter buffer at a variable output rate to account for jitter in the received frames, wherein variations in the output rate are controlled in dependence upon the visual information content of the video signal, the visual information content of the video signal being the portion of the video signal that is to be displayed when the video signal is played out.

According to a fourth aspect of the invention there is provided a method of processing a video signal, the video signal comprising a plurality of frames, the method comprising: analyzing the visual information content of the video signal, the visual information content of the video signal being the portion of the video signal that is to be displayed when the video signal is played out; in dependence upon the analysis of the visual information content, determining a respective sensitivity of each of the frames of the video signal to variations in the rate at which frames of the video signal are played out; and marking each of the frames with a mark indicating the respective determined sensitivity.

According to a fifth aspect of the invention there is provided apparatus for processing a video signal, the video signal comprising a plurality of frames, the apparatus comprising: means for analyzing the visual information content of the video signal, the visual information content of the video signal being the portion of the video signal that is to be displayed when the video signal is played out; means for determining, in dependence upon the analysis of the visual information content, a respective sensitivity of each of the frames of the video signal to variations in the rate at which frames of the video signal are played out; and means for marking each of the frames with a mark indicating the respective determined sensitivity.

According to a sixth aspect of the invention there is provided a computer program product comprising a non-transitory computer readable medium storing thereon computer readable instructions for execution by a processor for processing a video signal, the video signal comprising a plurality of frames, the instructions comprising instructions for: analyzing the visual information content of the video signal, the visual information content of the video signal being the portion of the video signal that is to be displayed when the video signal is played out; in dependence upon the analysis of the visual information content, determining a respective sensitivity of each of the frames of the video signal to variations in the rate at which frames of the video signal are played out; and marking each of the frames with a mark indicating the respective determined sensitivity.

The inventors have realized that altering the output rate of the video frames speeds up or slows down the playback of the video signal, and that this can result in visual artifacts in the video signal in the form of too fast or too slow movements in the displayed signal, thereby distorting the video signal.

However, advantageously, the visual information content of the video signal is taken into account and variations in the output rate of frames from the jitter buffer are controlled considering the perceived distortion which such variations would introduce to the visual information content. The inventors have realized that the perceptual distortion caused by variations in the output rate of the frames from the jitter buffer is greater for some visual information content than for other visual information content. Variations in the output rate can be controlled to be greater for frames for which the variations will cause a lower level of perceptual distortion. The result of this is that playback speed related distortions in the video signal are much less visible (i.e. much less noticeable to a user viewing the visual information content of the video signal) compared to prior methods which do not take into account the visual information content of the video signal. Since the playback speed related distortions are less noticeable to a user, a more perceptually pleasant playback of the video signal is achieved.

Preferably, the variations in the output rate are controlled such that a significant variation in the output rate occurs only for frames for which there is a low level of motion in the visual information content. Also preferably, the variations in the output rate are controlled such that variations in the output rate are reduced as motion in the visual information content increases. The term "motion" is used to mean the amount of visual information content per frame that changes (compared to the previous frame). Variations in the output rate are less noticeable to a viewer of the video signal when they occur for sequences of frames which have a relatively low level of motion in the visual information content when they are played out. The inventors have realized that if the device at which the video signal is to be output is a mobile device then the user tends to shake the mobile device, such that the quality of motion in the video signal may be perceptually less important to the user than when the device is not a mobile device. Therefore, knowledge of whether the output device is a mobile device or not may be used to control the output rate of the video signal accordingly.

Preferably, each frame comprises a mark indicating a sensitivity of the frame to variations in the rate at which frames of the video signal are played out, and the variations in the output rate are controlled in dependence upon the marks of the frames. The marks can be added to the frames either at the encoder, at the decoder or at another node in the communications network. Preferably the output rate of the frames is significantly varied only when the mark of the frames being output indicates that the frames are relatively insensitive to variations in the rate at which frames of the video signal are played out.

The appearance of the visual information content of frames of the video signal can be determined and used to determine the sensitivity of the frames to changes in the rate at which the frames are played out. The inventors have realized that by taking the visual information content of the frames into account when varying the rate at which the frames are played out a more perceptually pleasant playback of the video signal can be achieved.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
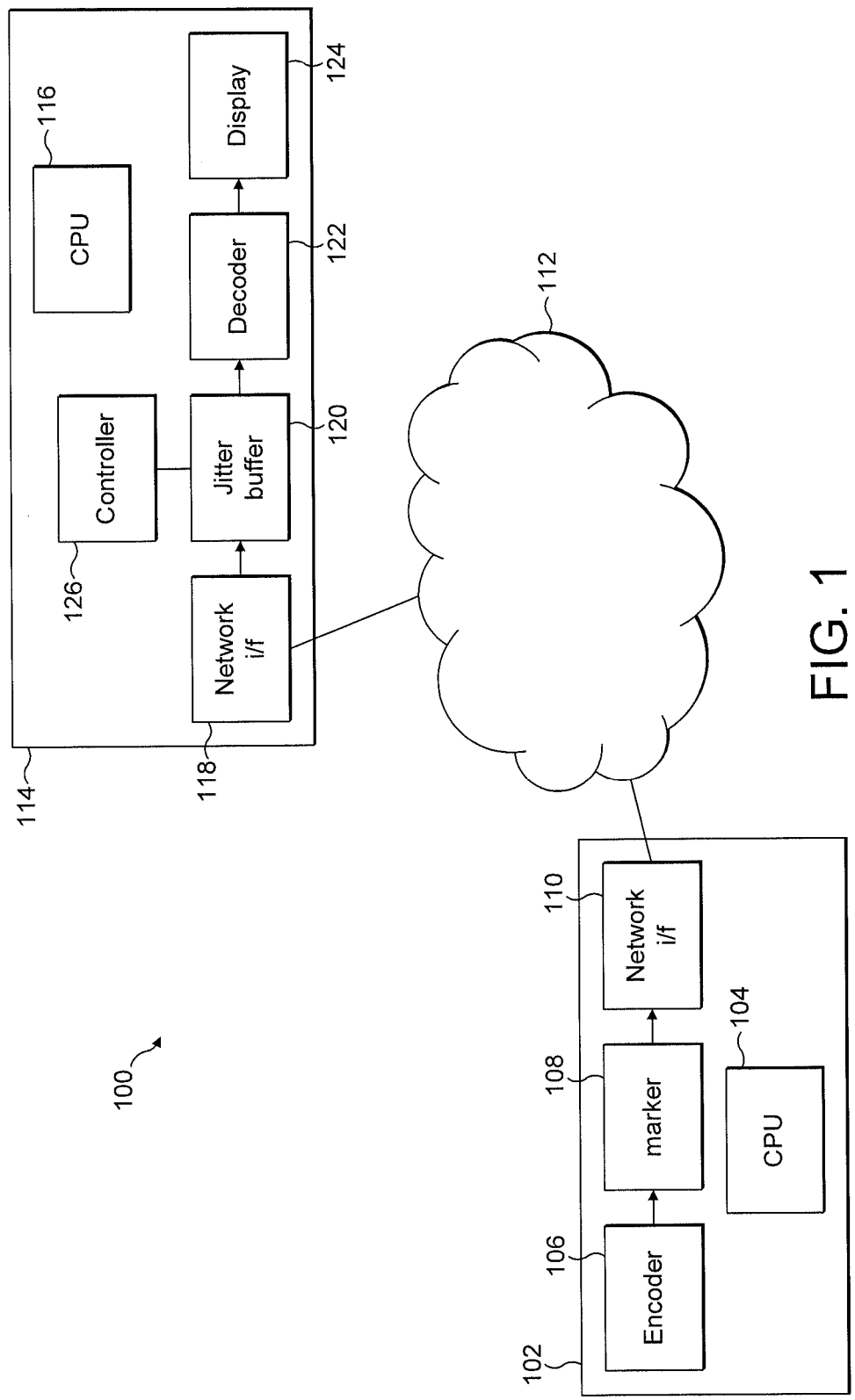
FIG. 1 is a schematic representation of a communications network according to a preferred embodiment.

With reference to FIG. 1 there is now described a communications network 100 according to a preferred embodiment. The communications network 100 comprises a device 102 and a device 114 which can communicate with each other over the network 100 via the rest of the communications network, denoted generally as 112 in FIG. 1. The communications network 100 may, for example, be the internet. The device 102 comprises a CPU 104, an encoder block 106, a marker block 108 and a network interface block 110. The CPU 104 controls the operation of the other blocks in the device 102 as would be apparent to a person skilled in the art. An output of the encoder block 106 is coupled to an input of the marker block 108. An output of the marker block 108 is coupled to an input of the network interface block 110. The network interface block 110 is coupled to the rest of the network 112.

The device 114 comprises a CPU 116, a network interface block 118, a jitter buffer 120, a decoder block 122, a display 124 and a controller block 126. The CPU 116 controls the operation of the other blocks in the device 114 as would be apparent to a person skilled in the art. The network interface block 118 is coupled to the rest of the network 112. An output of the network interface block 118 is coupled to an input of the jitter buffer 120. An output of the jitter buffer 120 is coupled to an input of the decoder block 122. An output of the decoder block 122 is coupled to an input of the display 124. The controller block 126 is coupled to the jitter buffer 120 to control the operation thereof.

Figure 2:
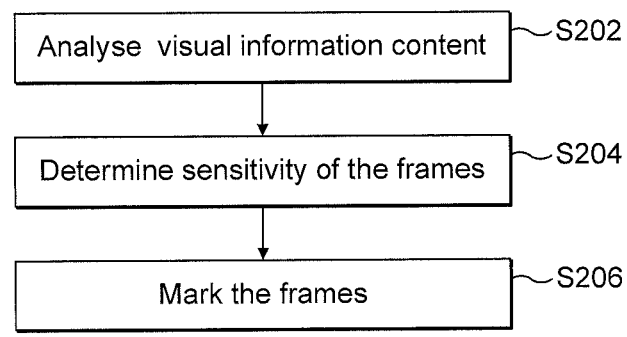
FIG. 2 is a flow chart for a process of marking the frames of a video signal according to a preferred embodiment.

The operation of the network 100 is now described with reference to FIG. 2 which shows a flow chart for a process of marking the frames of a video signal according to a preferred embodiment. The device 102 will send a video signal to the device 114 via the rest of the communications network 112. The frames of the video signal are encoded in the encoder block 106 using a particular protocol that is known to both device 102 and device 114.

In step S202 the visual information content of the frames of the video signal is analyzed. The visual information content is the portion of the video signal that will be displayed when the video signal is played out. In other words, the visual information content is the part of the video signal that a viewer will see when the video signal is played out, and this part of the video signal is analyzed. In this way, the step of analyzing the visual information content comprises determining the appearance of the visual information content.

In step S204, based on the analysis of the visual information content of the frames the sensitivity of each of the frames of the video signal to variations in the rate at which frames of the video signal are played out is determined. The inventors have realized that the sensitivity of the frames to variations in the rate at which frames are played out depends upon the visual information content of the frames of the video signal. For example, the sensitivity of frames for which there is a relatively high level of motion in the visual information content is higher than the sensitivity of frames for which there is a relatively low level of motion in the visual information content. Frames with a relatively high level of motion have a relatively large amount of visual information content that has changed from that of the previous frame. Likewise, frames with a relatively low level of motion have a relatively small amount of visual information content that has changed from that of the previous frame. Other factors may also affect the sensitivity of the frames. For example, an audio signal corresponding to the video signal may accompany the video signal and the step of determining the sensitivity of the frames may depend upon analysis of the audio signal. For example, when the video signal depicts a person talking, hints from the audio signal can be used to determine whether synchronization between the video signal and the audio signal (e.g. lip sync) is important or not. When the visual information content of the video signal depicts a person talking, the video frames are very sensitive to variations in the rate at which frames are played out because a viewer of the video can easily notice distortions in the timing of the video signal when a person is talking.

In step S206 the marker block 108 marks the frames with their determined sensitivity. Therefore, following step S206 the frames have a mark which indicates the sensitivity of the frames to variations in the rate at which the frames are played out. The frames can then be sent over the rest of the network 112 to the device 114 using the network interface blocks 110 and 118. Although FIG. 1 shows the marker block 108 being separate from the encoder block 106, in other embodiments, the marker block 108 is part of the encoder block 106. In these other embodiments, the marking operation may be part of the encoding process wherein a lot of useful information about the video signal is derived during the encoding process which can be used to mark the frames in the marking process. In yet further embodiments, the marker block 108 may be situated before the encoder block 106 such that the marking process operates on the unencoded signal (before encoding is performed in the encoder block 106).

Figure 3:
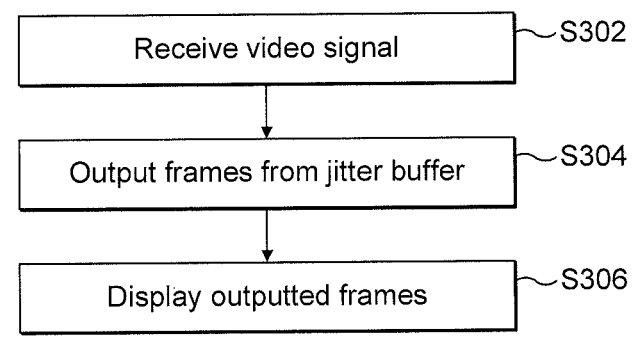
FIG. 3 is a flow chart for a process of outputting frames from a jitter buffer according to a preferred embodiment.

The operation of the device 114 will now be described with reference to FIG. 3 which shows a flow chart for a process of outputting frames from the jitter buffer 120 according to a preferred embodiment. As described above, the device 114 receives frames of a video signal at the network interface block 118. In step S302 the frames are passed to the jitter buffer 120. The frames are stored in the jitter buffer 120 in order to account for jitter in the received frames. The controller block 126 is used to control the rate at which the frames are outputted from the jitter buffer 120. In step S304 frames are outputted from the jitter buffer 120, and are received at the decoder block 122 where the frames are decoded using the same protocol that the encoder block 106 used to encode the frames, as is known in the art. The decoded frames then pass to the display 124 and in step S306 the frames are displayed on the display 124.

The marks of the frames are used by the controller block 126 to determine the output rate of the frames outputted from the jitter buffer 120. In particular, where the mark of a frame indicates that the frame is highly sensitive to variations in the rate at which frames are played out then the output rate of the frame from the jitter buffer is not varied (as compared with the output rate of the previous frame). Whereas, where the mark of a frame indicates that the frame is not highly sensitive to variations in the rate at which frames are played out then the output rate of the frame from the jitter buffer may be varied. The output rate of the frames from the jitter buffer 120 determines the rate at which the frames are played out when they are displayed on display 124.

The controller block 126 controls variations in the output rate from the jitter buffer 120 to account for jitter in the received frames, taking consideration of the visual information content of the frames. As described above, this can be achieved by marking the frames with a mark indicating the sensitivity of the frames to variations in the rate at which the frames are played out, such that the controller block 126 can simply read the marks of the frames to thereby take the visual information content of the frames into account when determining the variations in the output rate from the jitter buffer 120.

As an example, significant speedups or slowdowns of the output rate may only be performed in regions of the video (in time and/or space) where there is little motion in the visual information content of the video signal. In some embodiments the jitter buffer holds sections (i.e. spatial regions) of video frames. For example, if the background in a video frame is static, only spatial regions of the frame in which there is motion may be sent. In this case, as described above, significant speedups or slowdowns of the output rate might only be performed in spatial regions of the video where there is little motion in the visual information content of the video signal.

As described above, the marker block 108 can take into account the content of an audio signal which accompanies the video signal in determining the sensitivity of the video frames. The determination of the output rate of the video frames from the jitter buffer 120 may also take into account the content of the audio signal and the timestamp of the audio frames. A corresponding audio jitter buffer may decide to delay, or speed up, audio frames for various reasons as is known in the art. The controller block 126 can weight the cost on changing the playback speed of the video signal against the cost of having the audio and video signals unsynchronized to determine how to vary the output rate of the video frames from the jitter buffer 120. As mentioned above, when the audio signal is conveying speech it is important to have audio and video signals synchronized.

The importance of having the audio and video signals synchronized may depend upon the quality of the video signal. For example, for a higher quality video signal (e.g. higher resolution, frame rate or bit rate) it may be more important to synchronize the audio and video signals because any lack of synchronization between the audio and video signals is more apparent to the user when the quality of the video signal is high. The controller block 126 may not try to synchronize the audio and video signals to such a high degree (i.e. take a more relaxed approach) when the quality of the video signal is lower.

In the method described above, steps S202 and S204 are implemented in the device 102, for example in the encoder block 106, in the marker block 108 or by the CPU 104. Step S206 is implemented in the marker block 108 of the device 102. In this way the marking of the frames is performed at the transmitting device 102, i.e. at the encoder end of the transmission. The encoder block 106 analyses the video signal as part of the encoding process and has access to the original video so it can be efficient to perform the marking at the transmitting device 102. The frames can be assigned a relative sensitivity and this can be signaled to the controller block 126 of the receiving device 114 using in band or out band signals.

In alternative embodiments the marking of the frames can be implemented at the receiving device 114 (i.e. at the decoder end of the transmission) rather than at the transmitting device 102. This is less efficient than performing the marking of the frames at the transmitting device 102 because the receiving device 114 (as well as the transmitting device 102) is then required to analyze the video signal. However, the advantage of performing the marking at the receiving device 114 is that this does not require a special encoder do derive parameters. This allows the invention to be implemented at the receiving device 114 even in scenarios where a video signal is received from a third party device in the communications network 100 that does not implement the invention.

In further alternative embodiments, the marking of the frames may be performed at a further node in the rest of the communications network 112. The further node receives the video signal as it is sent from the transmitting device 102, performs the marking process and then forwards the video signal on to the receiving device 114. In this way, stream analysis is performed at the further node to analyze the visual information content of the video signal, outside of the transmitting device 102. These embodiments may not be as efficient as the other embodiments described above because processing of the video signal is required at the further node, where little or no processing was previously required. However, the advantage of using the further node is that neither the transmitting device 102 nor the receiving device 114 is required to have the ability to analyze the visual information content of the video signal to determine the sensitivity of the frames to variations in the rate at which the frames are played out.

FIG. 1 shows the jitter buffer 120 ahead of the decoder block 122 such that the received frames are passed to the jitter buffer 120 to account for jitter in the received frames and then the frames outputted from the jitter buffer are passed to the decoder block 122 for decoding. In alternative embodiments the decoder block may be ahead of the jitter buffer in the processing of a received video signal, such that the video signal is decoded in the decoder block and then the frames are passed to the jitter buffer to account for jitter in the received frames.

In further embodiments, there may be two jitter buffers: a first jitter buffer positioned ahead of the decoder block 122 and a second jitter buffer positioned after the decoder block 122. The controller block 126 can make decisions based on the CPU availability and the sensitivity of the video data to changes in the output rate to determine how quickly to move data from the first jitter buffer to the second jitter buffer. For instance with infinite CPU resources available it would be preferable to empty the first jitter buffer as soon as possible and then make the decisions regarding variations to the output rate of the video frames based on decoded data. In practice, some data will be in both the first and the second jitter buffers.

Similarly, FIG. 1 shows the encoder block 106 being ahead of the marker block 108 in the processing of a video signal at the device 102, such that the video signal is encoded in the encoder block 106 and then the encoded frames are passed to the marker block 108 to mark the frames accordingly as described above. In alternative embodiments, the marker block may be ahead of the encoder block such that the frames are marked by the marker block and then the frames are encoded in the encoder block.

The blocks 106 to 110 and 118 to 126 may be implemented in software or hardware at the devices 102 and 114 as would be apparent to a person skilled in the art. Similarly, the method steps represented in FIGS. 2 and 3 may be implemented in software or hardware at the devices 102 and 114.

As is known in the art the communications network 100 may use a peer-to-peer ("P2P") topology built on proprietary protocols to allow the communication between the device 104 and the device 114. Alternatively, the communications network 100 may use another topology to allow the communication between the device 104 and the device 114, such as a centralized server based communications system.

The method steps described above may be implemented at the device 102 and the device 114 by way of computer readable instructions. In this sense a computer program product can be provided comprising a non-transitory computer readable medium storing thereon computer readable instructions for execution by the CPUs (104 and 116) for performing the method steps described above to thereby process the video signal accordingly.

While this invention has been particularly shown and described with reference to preferred embodiments, it will be understood to those skilled in the art that various changes in form and detail may be made without departing from the scope of the invention as defined by the appendant claims.

What is claimed is:

1. A method of processing a video signal, the video signal comprising a plurality of frames, the method comprising:
 receiving the frames of the video signal at a jitter buffer, the jitter buffer configured to include an ability to:
  hold multiple sections of the video signal, each section associated with a separate region of the video signal; and
  output at least one section of the video signal at a different output rate than other sections of the video signal; and
 outputting the frames from the jitter buffer at a variable output rate to account for jitter in the received frames, wherein variations in the variable output rate are controlled in dependence upon visual information content associated with the video signal, the visual information content associated with the video signal being a portion of the video signal that is to be displayed when the video signal is played out.

2. The method of claim 1 wherein the variations in the output rate are controlled in dependence upon a determination of a perceived distortion that the variations in the variable output rate would introduce to the visual information content.

3. The method of claim 1 wherein the variations in the output rate are controlled such that variations in the variable output rate are reduced as motion in the visual information content increases.

4. The method of claim 1 wherein each frame comprises a mark indicating a sensitivity of the frame to variations in a rate at which frames of the video signal are played out, and wherein the variations in the variable output rate are controlled in dependence upon the marks of the frames.

5. The method of claim 4 further comprising marking each frame with the mark.

6. The method of claim 5 further comprising analyzing the visual information content associated with the video signal to determine the sensitivity of each frame to variations in the rate at which frames of the video signal are played out, for use in marking the frames.

7. The method of claim 6 further comprising analyzing an audio signal corresponding to the video signal for use in determining the sensitivity of each frame to variations in the rate at which frames of the video signal are played out.

8. The method of claim 1 wherein the jitter buffer is part of a receiving device and the video signal is received at the jitter buffer from a transmitting device over a communications network.

9. The method of claim 5 wherein the jitter buffer is part of a receiving device and the video signal is received at the jitter buffer from a transmitting device over a communications network, and
 wherein marking each frame with the mark is performed at:
  (i) the transmitting device; (ii) the receiving device; or
  (iii) a further device in the communications network.

10. The method of claim 1 further comprising playing out the frames outputted from the jitter buffer at the variable output rate.

11. An apparatus for processing a video signal, the video signal comprising a plurality of frames, the apparatus comprising:
- a jitter buffer for receiving the frames of the video signal, the apparatus being configured to output the frames from the jitter buffer at a variable output rate to account for jitter in the received frames, wherein the jitter buffer is further configured to:
  - hold multiple sections of the video signal, each section associated with a separate region of the video signal; and
  - output at least one section of the video signal at a different output rate than other sections of the video signal,
- the apparatus further comprising a controller for controlling variations in the variable output rate in dependence upon visual information content associated with the video signal, the visual information content associated with the video signal being a portion of the video signal that is to be displayed when the video signal is played out.

12. The apparatus of claim 11 further comprising means for marking each frame with a mark indicating a sensitivity of the frame to variations in a rate at which frames of the video signal are played out, wherein the controller is configured to control the variations in the variable output rate in dependence upon the marks of the frames.

13. The apparatus of claim 12 further comprising means for analyzing the visual information content associated with the video signal to determine the sensitivity of each frame to variations in the rate at which frames of the video signal are played out, for use by the means for marking the frames.

14. The apparatus of claim 11 wherein the jitter buffer is part of a receiving device, the apparatus further comprising a transmitting device for transmitting the video signal over a communications network to the jitter buffer.

15. The apparatus of claim 11 further comprising means for playing out the frames outputted from the jitter buffer at the variable output rate.

16. A computer program product comprising computer readable storage memory storing thereon computer readable instructions for processing a video signal comprising a plurality of frames, the instructions, responsive to execution by a processor, configured to perform a method comprising:
- receiving the frames of the video signal at a jitter buffer;
- using marks added into the frames of the video signal to determine one or more output rates; and
- outputting the frames from the jitter buffer at a variable output rate based, at least in part, on the determined one or more output rates, to account for jitter in the received frames, wherein variations in the output rate are controlled in dependence upon visual information content associated with the video signal, the visual information content of the video signal being the portion of the video signal that is to be displayed when the video signal is played out.

17. The computer program product of claim 16, wherein the variations in the variable output rate are controlled in dependence upon a determination of a perceived distortion that the variations in the variable output rate would introduce to the visual information content.

18. The computer program product of claim 16, wherein the variations in the output rate are controlled such that variations in the variable output rate are reduced as motion in the visual information content increases.

19. The computer program product of claim 16, wherein each frame comprises a mark indicating a sensitivity of the frame to variations in a rate at which frames of the video signal are played out.

20. The computer program product of claim 19, the method further comprising marking each frame with the mark.

21. The computer program product of claim 20, the method further comprising analyzing the visual information content associated with the video signal to determine the sensitivity of each frame to variations in the rate at which frames of the video signal are played out, for use in marking the frames.

22. The computer program product of claim 21, the method further comprising analyzing an audio signal corresponding to the video signal for use in determining the sensitivity of each frame to variations in the rate at which frames of the video signal are played out.

23. The computer program product of claim 16, wherein the jitter buffer is part of a receiving device and the video signal is received at the jitter buffer from a transmitting device over a communications network.

24. The computer program product of claim 20 wherein the jitter buffer is part of a receiving device and the video signal is received at the jitter buffer from a transmitting device over a communications network, and
- wherein marking each frame with the mark is performed at: (i) the transmitting device; (ii) the receiving device; or (iii) a further device in the communications network.

25. The computer program product of claim 16, the method further comprising playing out the frames outputted from the jitter buffer at the variable output rate.

* * * * *